United States Patent Office 2,855,372
Patented Oct. 7, 1958

2,855,372

UREAMIDE-EPOXIDE COMPOSITIONS

Robert W. Jenkins, San Diego, Giles A. Plew, Rivera, and Irving Katz, Long Beach, Calif., assignors to North American Aviation, Inc.

No Drawing. Application August 24, 1956
Serial No. 607,538

8 Claims. (Cl. 260—18)

This invention relates to a new ureamide-epoxide composition. More particularly, this invention relates to ureamide-glycidyl polyether compositions capable of conversion into insoluble resilient polymers.

Amide-epoxide compositions have been prepared in the past in which the amide was the product of a fatty acid and an aliphatic amine. The amides when reacted with epoxide compounds produce complex amide-epoxide resins. The resins upon curing produce hard plastics which have certain disadvantages. The plastic materials are firm and unyielding. They have little resilience and, upon heating or curing, contract and crack. These properties make the plastics unsuitable for purposes where a high degree of resilience is required especially at high temperatures.

It is therefore an object of this invention to provide a novel amide-epoxide composition. It is likewise an object to provide a stable amide-epoxide composition having a long pot life. Another object of this invention is to provide an amide-epoxide copolymer which has a high degree of resilience at elevated temperatures. It is also an object to provide an amide-epoxide copolymer composition which does not crack or shrink during or after curing or when subjected to elevated temperatures. Other objects of this invention will become more apparent from the discussion that follows.

The above and other objects of this invention are provided by a composition of matter comprising (1) an amide obtained by reacting a dicarboxylic organic acid having an average of at least one free carboxyl group per molecule, with a urea having the general formula

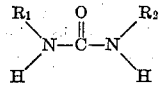

wherein $R_1$ and $R_2$ are hydrocarbon groups having from 1 to about 20 carbon atoms, and (2) a glycidyl polyether compound having terminal epoxy groups. The acid amide obtained by reacting an organic carboxylic acid with urea will be called a ureamide in this writing. An example is a ureamide of sebacic acid wherein each of the nitrogens of the urea has an octadecyl hydrocarbon substituent thereon. This sebacic acid ureamide is then added to a diglycidyl ether of ethylene glycol which is obtained by the reaction of epichlorohydrin with ethylene glycol. The sebacic acid ureamide and diglycidyl ether of ethylene glycol forms a composition of matter which, upon being subjected to an elevated temperature sufficient to bring about a reaction, causes the formation of a resilient plastic which does not crack or shrink at temperatures approaching its ignition point.

The acids employed in making the ureamides are organic dicarboxy acids having from 2 to about 36 carbon atoms. Nonlimiting examples of such acids are the aliphatic saturated and unsaturated dicarboxylic acids such as oxalic acid, malonic acid, succinic acid, adipic acid, suberic acid, azelaic acid, sebacic acid, the dimer of linoleic acid, having the general formula $C_{36}H_{64}O_4$, fumaric and maleic acids, 2-pentene-1,5-dioic acid, allyl malonic acid and its derivative, ethallyl malonic acid, etc. The above constitute the preferred acids which are used either alone or as mixtures of two or more in the preparation of the compositions of this invention. Polycarboxylic aromatic acids such as phthalic acid may also be employed.

Another group of acids that can be used are any of the above-mentioned dicarboxylic acids which have been partially esterified with glycols. An example is sebacic acid which has been reacted with polyethylene glycol having an average molecular weight of 400, in the presence of zinc chloride as a catalyst. The molar ratio of acid-to-glycol is not less than 1. Hence, there is an average of at least one free carboxyl group per acid molecule available for reaction with a substituted urea for amide formation. Stating this in another manner, there is at least one free carboxyl group equivalent per mole of dicarboxylic acid. This free carboxy group is available for reaction with a substituted urea to form a urea amide of the acid. The glycol used to partially esterify the polybasic acid can be a polyether glycol and can, therefore, have an average of from 2 to about 40 carbon atoms and from 2 to about 22 oxygen atoms per molecule. The glycol can be a mixture of polyhydric alcohols as, for example, a mixture of different polyethylene glycols. When the glycol is ethylene glycol having 2 carbon atoms and 2 oxygen atoms, the molecular weight is 62. When a polyethylene glycol is used having an average molecular weight of 400, the average number of carbon atoms per average molecule is approximately 18, while the average number of oxygen atoms is approximately 10.

The ureas that are employed in the manufacture of the ureamides of this invention have the general formula

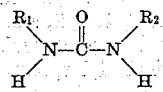

wherein $R_1$ and $R_2$ are hydrocarbon groups having from 1 to about 20 carbon atoms. The atoms in the chain —N—C—N— are numbered 1,2,3 so that the ureas are 1,3-disubstituted ureas. In other words, $R_1$ is on a nitrogen in the one position while $R_2$ is substituent on the nitrogen in the three position. Hence, when $R_1$ and $R_2$ are methyl groups, the compound is called 1,3-dimethyl urea. Other nonlimiting examples of ureas that are employed in the preparation of the ureamides are 1-methyl-3-ethyl urea, 1,3-diethyl urea, 1,3-dipropyl urea, 1,3-dibutyl urea, 1-ethyl-3-tert.-butyl urea, 1,3-diamyl urea, 1-ethyl-3-hexyl urea, 1,3-dicyclohexyl urea, 1,3-dioctyl urea, 1,3-didodecyl urea, 1,3-dioctadecyl urea, 1,3-dieicocyl urea, etc. In the preparation of the ureamides a single 1,3-hydrocarbon substituted urea compound or a mixture of 2 or more different such urea compounds may be employed with one or a mixture of two or more different dibasic organic acids. Ureas such as 1,3-diphenyl urea, 1-methyl-3-phenyl urea, 1,3-ditolyl urea, and 1,3-dibenzyl urea may also be used.

The substituted ureas may be prepared by methods well known in the art such as the reaction of alkyl halides with amines. Such processes are discussed in various organic texts as for example in the Textbook of Organic Chemistry by Fieser and Fieser, 1950 Edition, published by D. C. Heath and Company, New York.

While the hydrocarbon substituents attached to the nitrogen atoms of the ureas may have from 1 to about 20 carbon atoms, the preferred ureas have substituents containing from 1 to about 12 carbon atoms. Thus, one of the preferred ureas is 1,3-didodecyl urea. Ureas having this preferred number of carbon atoms in the hydrocarbon substituents produce final ureamide-epoxide compositions having good resilience and heat resistant properties at elevated temperatures. Hydrocarbon substituents on the nitrogen having more than 12 carbon atoms increase the weight of the compound used, but do not enhance the physical properties of the final product. Therefore, the preferred embodiment of this invention is the use of ureas having a total of 3 to about 25 carbon atoms.

When preparing the ureamides which are used in making the ureamide-epoxide compositions of this invention, the substituted urea is reacted with a dibasic organic acid or partially esterfied derivative thereof in such proportions that there is present from 1 to 3 nitrogen atoms per carboxyl group.

The glycidyl polyether compound employed in preparing the ureamide-epoxide compositions are obtained by reacting a dihydroxy hydrocarbon with an epihalohydrin, which is a halogenated epoxy hydrocarbon compound, in the presence of either a base or an acid. For example, the reaction of a mol of 2,2-bis(4-hydroxyphenyl)propane with 1 or more mols of epichlorohydrin in the presence of a base such as sodium hydroxide produces a glycidyl polyether having terminal epoxy groups. Similarly, 1 mol of diethylene glycol can be reacted with one or more mols of 1,2-epoxy-3-chlorohexane in the presence of an acid catalyst such as borontrifluoride or its derivatives to produce a polyether compound having epoxy groups at each end of the molecules. These glycidyl ether compositions and method for their preparation are described in various technical publications. Various patents also refer to methods for the preparation of glycidyl polyether compounds. Among them are the Castan Patents 2,324,483 and 2,344,333. The product that is obtained when epihalohydrin is one of the reactants may be represented by the formula

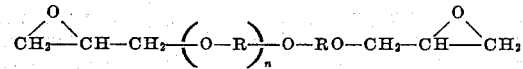

wherein R represents a divalent hydrocarbon group and $n$ is an integer of the series 0, 1, 2, 3, etc. In general, these glycidyl ethers have an epoxy equivalency greater than 1.0 and contain terminal 1,2-epoxy groups. By the epoxy equivalency is meant the number of 1,2-epoxy groups per average molecular weight of the glycidyl ether. Since the measured molecular weight of the mixture, upon which the epoxy equivalency is dependent, is the average molecular weight, the epoxy equivalency will not necessarily be 2.0 but will be between 1.0 and 2.0.

When the dihydric alcohols employed in the preparation of the glycidyl polyethers are saturated aliphatic alcohols in which each carbon atom is bonded by single bonds to four different other atoms or groups of atoms, they may have from 2 to about 20 carbon atoms and from 2 to about 11 oxygen atoms. These include dihydroxy saturated hydrocarbons such as 1,2-dihydroxyethane, 1,3-dihydroxypropane, 1,8-dihydroxyoctane, 1,2-dihydroxydodecane, dihydroxyeicosane, etc. Another class of dihydroxy compounds that can be used consists of polyether glycols such as diethylene glycol, dipropylene glycol, hexaethylene glycol, decaethylene glycol, etc. When preparing the glycidyl polyether compounds one or a mixture of two or more alcohols can be employed. Dihydric aromatic compounds having from 1 to 2 aromatic nuclei in the molecule may also be used. Examples of these are: catechol, hydroquinone, ethyl resorcinol, 2,2-bis(4-hydroxyphenyl)propane, bis(4-hydroxyphenyl)methane, 2,2-bis(4-hydroxyphenyl)butane, 1,5-dihydroxynaphthalene, etc.

Examples of epihalohydrins employed in the preparation of the polyether compounds are 1,2-epoxy-3-chloropropane, 1,2-epoxy-4-chlorobutane, 1,2-epoxy-8-bromooctane, 2,3-epoxy-5-chlorododecane, 5,6-epoxy-7-bromoeicosane. Of these the 1,2-epoxy-3-halopropanes such as 1,2-epoxy-3-chloropropane, gives very good results and its use constitutes a preferred embodiment in the instant invention. A method for the preparation of epihalohydrins is given in Organic Syntheses by Gilman, volume I, 2nd Ed., John Wiley and Sons, Inc., New York.

The ureamide used in this invention is prepared by reacting a dicarboxylic acid or a partially esterified derivative thereof with a 1,3-dihydrocarbon substituted urea in a suitable reaction vessel. Heat is applied and the temperature slowly increases to about 150° C. or more, at which point the reaction is substantially complete. An alternative method is the slow addition of the urea compound to the dicarboxylic acid while heating the latter. This alternate method is preferred where excessive foaming occurs upon the addition of the urea to the acid.

The compositions of this invention consist of a ureamide of the type described above together with a glycidyl polyether in proper proportions. Therefore, an embodiment of this invention is a composition of matter comprising (1) an acid amide obtained by reacting a dicarboxylic fatty acid having an average of at least one free carboxyl group per acid molecule and from 2 to about 36 carbon atoms, with urea having the general formula

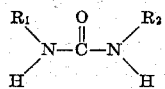

wherein $R_1$ and $R_2$ are hydrocarbon groups having from 1 to about 20 carbon atoms, the proportion of said urea being such that there is present from 1 to 3 nitrogen atoms per carboxyl group, and (2) a glycidyl polyether compound having terminal epoxy groups obtained by reacting a halohydrin with a dihydroxy organic compound which is a carbon, hydrogen, and oxygen-containing organic compound.

When the ureamide-epoxide compositions are employed as binders in rocket propellant manufacture, superior products are obtained when all hydrocarbon components are nonaromatic. Therefore, compositions are preferred in which $R_1$ and $R_2$ of the substituted urea molecule are saturated hydrocarbon groups having from 1 to about 20 carbon atoms, and wherein the dihydroxy organic compound is a carbon, hydrogen, and oxygen-containing compound having single carbon-to-carbon bonds. An example is a composition of matter comprising (1) an amide obtained by reacting dilinoleic acid dimer with 1,3-dimethyl urea and (2) the diglycidyl ether of triethylene glycol. The proportion of the diglycidyl ether is such that there is present from 0.33 to 3 epoxide groups per nitrogen atom. The proportion of urea that is used is such that there is present from 1 to 3 hydrogen atoms per carboxyl group of the dibasic organic acid.

The ureamide-epoxide compositions of this invention form copolymers when subjected to a temperature sufficient to bring about copolymerization. These copolymers constitute an embodiment of this invention. Copolymerization occurs at temperatures of from about 20° C. to about 150° C. and higher. Copolymers thus formed are firm and resilient in nature and adhere well to surfaces with which they are in contact during polymerization. Therefore, a mold release such as Teflon is applied to surfaces in contact with the composition when it is not intended to have such surfaces bonded to the copolymer.

The following examples will more clearly illustrate the compositions of this invention and the methods for their preparation.

*Example I*

To a reaction vessel equipped with heating and cooling means, means for agitation, means for refluxing liquids, and means for distillation containing 56 parts of dilinoleic acid dimer which is obtained by dimerizing linoleic acid at elevated temperature, was added 19 parts of 1,3-dimethyl urea over a period of 5 to 6 hours at 150–170° C. The components were heated till the viscosity reached 28,100 centipoises at 22° C., and the mixture had a pH of 7.1. The water by-product of the reaction was removed by distillation. The viscosity of the ureamide thus formed was 790 centipoises at 66° C. To the ureamide was then added, 81 parts of diglycidyl ether of 2,2-bis(4-hydroxyphenyl)propane prepared by reacting 1,2-epoxy-3-chloropropane with 2,2-bis(4-hydroxyphenyl) propane in the presence of sodium hydroxide. The composition had a pot life of 8 days at a temperature of substantially 66° C. At higher temperatures the pot life was 3 days at 99° C., 1.5 days at 121° C. and about 20 hours at 149° C. Upon setting, the composition formed a firm and resilient plastic which did not shrink or crack.

The amount of acid and urea used in Example I were such as to provide substantially 2.1 nitrogen atoms per carboxyl group. The amount of diglycidyl ether used was such that there was substantially 1 epoxide group per nitrogen atom.

Example II

The procedure of Example I was repeated, substituting 74 parts of diglycidyl ether of triethylene glycol for the diglycidyl ether of 2,2-bis(4-hydroxyphenyl)propane. The diglycidyl ether of triethylene glycol was prepared by reacting 1,2-epoxy-3-chloropropane with triethylene glycol in the molar ratio of 2:1, respectively, in the presence of boron trifluoride. The product was a ureamide-epoxide composition which upon being subjected to a temperature of substantially 70° C. for a period of 10 hours, set into a firm and resilient plastic. The polymerized ureamide-epoxide composition did not contract or crack up being subjected to temperatures above 70° C. The proportions of acid and urea used were such that there was present substantially 2.1 nitrogens per carboxyl group. The amount of the diglycidyl ether of triethylene glycol used was such that there was present substantially 1 epoxide group per nitrogen atom.

Example III

A polyester was prepared by refluxing 20 parts of sebacic acid with 20 parts of polyethylene glycol having an average molecular weight of 400, together with 0.5 wt. percent of zinc chloride as a catalyst. The refluxing was continued for a period of 15 hours under a nitrogen atmosphere at the end of which time the water by-product was removed by distillation. To the sebacic acid polyester thus formed was added 19 parts of 1,3-dimethyl urea and the mixture maintained at reflux temperature for a period of 15 hours. The water by-product was removed by distillation leaving a polyester ureamide which had a viscosity of 100,000 centipoises at 18° C. and 43,000 centipoises at 66° C. Following the procedure of Example I, 1 part of this polyester was added to 1 part of diglycidyl ether of triethylene glycol to form a ureamide-epoxide composition of this invention. Upon curing at 80° C. the composition set into a resilient plastic.

The ratio of nitrogen-to-carboxy groups in this instance was substantially 2.1:1, while the ratio of epoxide groups-to-nitrogen atoms was substantially 1:1.

When the polyethylene glycol is replaced by 3 parts of ethylene glycol in Example III, a ureamide-epoxide composition is likewise obtained.

Example IV

Following the procedure of Example I a ureamide is prepared by reacting 84 parts of 1,3-dioctadecyl urea with 9 parts of oxalic acid, providing a nitrogen-to-carboxyl ratio of 1.5:1. To this is added 1 part of tricresylphosphate as a plasticizer, and 20 parts of the glycidyl polyether obtained by reacting 21 parts of 1,2-epoxy-3-chlorododecane with 3 parts of ethylene glycol. This provides a composition in which the ratio of epoxide groups-to-nitrogen atoms is substantially 1:3.

In like manner a ureamide-epoxide composition is obtained when 1,3-dieicosyl urea is used in the process of Example IV, and the epihalohydrin is 1,2-epoxy-3-bromoeicosane.

Example V

A sebacic acid-ureamide-glycidyl polyether composition is prepared by first reacting 6 parts of 1,3-didodecyl urea with 1 part of sebacic acid. This is then added to 18 parts of a glycidyl polyether obtained by reacting 9.2 parts of epichlorohydrin with 14 parts of hexaethylene glycol. In this composition the ratio of nitrogen atoms-to-carboxyl groups is 3:1 and the ratio of epoxide groups-to-nitrogen atom is also 3:1.

Example VI

To 13 parts of partially esterified malonic acid obtained by reacting 10 parts of malonic acid with 3 parts of ethylene glycol is added 11 parts of 1,3-diethyl urea to produce a ureamide. To this is then added 7 parts of acetyl triethylene citrate as a plasticizer, and 31 parts of a polyether obtained by reacting 26 parts of 1,2-epoxy-3-bromododecane with 5.3 parts of diethylene glycol. The ratio of nitrogen atoms-to-carboxyl groups in the preparation of the ureamide is 1:1 and the ratio of epoxide groups-to-nitrogen atoms is also 1:1.

In like manner, a composition is obtained by substituting 16 parts of 1,2-dihydroxy eicosane for the diethylene glycol.

The compositions of this invention polymerize at temperatures of about 20° C. to about 150° C. and higher. Longer periods of time for copolymerization are required when using glycidyl polyether compounds which contain aromatic components. For example, the composition of Example I, in which the glycidyl polyethers contain phenyl groups, required more than 20 hours to cure at a temperature of substantially 150° C. while the composition of Example II requires only 2 to about 10 hours to cure at a temperature of substantially 60 to 90° C.

As indicated in the examples, plasticizers may be used in the preparation of the compositions of this invention in amounts of from about 1 to about 15 weight percent based on the amount of ureamide and glycidyl ether compounds employed. The plasticizers have the effect of prolonging the pot life of the ureamide glycidyl ether mixtures so that there is less danger of the material setting up prior to casting in a rocket or other mold. The plasticizer also serves to reduce the viscosity of the composition prior to curing. Nonlimiting examples of plasticizers that can be used are tricresyl phosphate, esters of organic acids such as di-2-ethylhexyl adipate, polyhydric alcohols such as ethylene glycol and glycerin, ether substituted esters such as butoxyethyl acrylate, ester substituted esters such as acetyl tributyl citrate, epoxy compounds such as allyl glycidyl ether, etc. Other plasticizers will readily suggest themselves to one skilled in the art.

The compositions of this invention have a variety of uses. They are used as impregnating and encapsulating resins for electrical units. When used for this purpose the container enclosing the unit is filled with the composition of this invention and then heated to a temperature sufficient to bring about copolymerization of the organic acid ureamide and glycidyl polyether. The compositions are also used as adhesives as, for example, in the manufacture of laminated structures, either of wood or of metal. Another use for the compositions of this invention is in the manufacture of solid rocket propellants in which they serve as binders for the oxygen carriers. An illustration of that use is given in the following example.

Example VI

To a reaction vessel containing 149 parts of the composition of Example II, kept in agitation, was added 222 parts of ammonium perchlorate containing 1 weight percent of ferric oxide burning catalyst. The mixture was agitated for a period of about 15 minutes while maintaining the temperature at substantially 60° C. Next, the propellant mixture was transferred to a casting vessel equipped with heating means and means for feeding the propellant in ribbon form into the desired mold such as a rocket motor. The casting vessel was connected to a vacuum vessel adapted to hold the mold or rocket motor and also equipped with means for agitating the rocket motor or mold. A rocket motor casing with a Teflon-coated mandrel inserted through the exhaust chamber at the rear end of the vessel and positioned longitudinally along the axis of the motor, was placed in the vacuum chamber. The open front end of the rocket motor was placed beneath the ribbon forming feeder means of the casting vessel. The air was next withdrawn from the vacuum vessel causing the propellant mixture to be fed from the casting vessel through the ribbon forming feeder means into the rocket motor casing. During this operation, the casting vessel was maintained at a temperature of substantially 60° C. The rocket motor casing was maintained in constant vibration by the agitating means in the vacuum vessel in order to settle the propellant charge being fed into the casing so as to completely fill the latter. When the rocket motor casing was filled with the propellant mixture which at this point had a viscosity of substantially 80,000 to 200,000 centipoises at a temperature of substantially 60° C., the closure cap was affixed to the front end of the rocket motor. The charged rocket motor was then subjected to a temperature of substantially 70° C. for a period of 10 hours. At the end of this time the charge had set so that the oxygen carrier particles of ammonium perchlorate were firmly held together by the ureamide-glycidyl-polyether copolymer. The propellant charge had a firm but resilient texture and had a high cohesive quality. The charge adhered well to the wall of the rocket motor casing. The Teflon-coated mandrel was withdrawn through the exhaust nozzle leaving a firing chamber longitudinally disposed along the axis of the rocket motor.

The rocket was mounted on a stationary test stand and fired. The charge burned evenly at the firing surface. There was no cracking of the charge nor did the charge pull away from the rocket wall. This illustrates the beneficial resilient and heat stable properties of the ureamide compositions of this invention.

When the compositions of this invention are used as adhesives or in making manufactured plastic articles, fillers of various kinds may be added. The fillers include such substances as titanium dioxide, talc, ferric oxide, iron, alumina, clay, etc. Other fillers will readily suggest themselves to one skilled in the art.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A composition of matter consisting essentially of (1) an acid amide obtained by heating a dicarboxylic organic acid having an average of at least one free carboxyl group per molecule, with a urea having the general formula

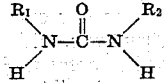

wherein $R_1$ and $R_2$ are saturated hydrocarbon groups having from 1 to about 20 carbon atoms, and (2) a glycidyl polyether compound having terminal epoxy groups obtained by heating an epihalohydrin having from 3 to about 20 carbon atoms with a compound selected from the class consisting of a dihydroxy hydrocarbon having from 2 to about 20 carbon atoms and a polyethylene glycol having from 2 to about 20 carbon atoms.

2. A composition of matter consisting essentially of (1) an acid amide obtained by heating a dicarboxylic fatty acid having an average of at least one free carboxyl group per molecule and from 2 to about 36 carbon atoms, with urea having the general formula

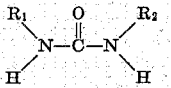

wherein $R_1$ and $R_2$ are saturated hydrocarbon groups having from 1 to about 20 carbon atoms, the proportion of said urea being such that there is present from 1 to 3 nitrogen atoms per carboxyl group, and (2) a glycidyl polyether compound having terminal epoxy groups obtained by heating an epihalohydrin having from 3 to about 20 carbon atoms with a compound selected from the class consisting of a dihydroxy hydrocarbon having from 2 to about 20 carbon atoms and a polyethylene glycol having from 2 to about 20 carbon atoms.

3. A composition of matter consisting essentially of (1) an amide obtained by heating dilinoleic acid dimer with 1,3-dimethyl urea and (2) the diglycidyl ether of triethylene glycol, the proportion of said diglycidyl ether being such that there is present from 0.33 to 3 epoxide groups per nitrogen atom.

4. The composition of claim 3 wherein the proportion of said urea is such that there is present from 1 to 3 nitrogen atoms per said carboxyl group.

5. A composition of matter consisting essentially of (1) an amide obtained by heating dilinoleic acid dimer with 1,3-dimethyl urea in amounts such that there is present substantially 2.1 nitrogen atoms per carboxyl group, and (2) diglycidyl ether of triethylene glycol in amounts such that there is present substantially 1 epoxide group per nitrogen atom.

6. The process of producing a ureamide-epoxide copolymer comprising heating (1) a dibasic amide obtained by heating a fatty acid having two carboxyl groups with a urea having the general formula

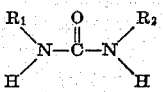

wherein $R_1$ and $R_2$ are hydrocarbon groups having from 1 to about 20 carbon atoms, the proportion of said urea being such that there is present from 1 to 3 nitrogen atoms per carboxyl group, with (2) a glycidyl polyether compound having terminal epoxy groups obtained by heating an epihalohydrin having from 3 to about 20 carbon atoms with a compound selected from the class consisting of a dihydroxy hydrocarbon having from 2 to about 20 carbon atoms and a polyethylene glycol having from 2 to about 20 carbon atoms, said process of heating (1) and (2) being carried out at a temperature sufficient to effect copolymerization.

7. The process of producing a ureamide-epoxy copolymer comprising heating (1) an amide obtained by heating dilinoleic acid dimer with 1,3-dimethyl urea, the proportions of said urea being such that there is from 1 to 3 nitrogen atoms per carboxyl group, with (2) a diglycidyl ether of triethylene glycol, the proportions of said diglycidyl ether being such that there is present from 0.33 to about 3 epoxide groups per nitrogen atom, said heating of (1) and (2) being carried out at a temperature sufficient to bring about copolymerization.

8. The process of producing a ureamide-epoxide copolymer comprising heating (1) a ureamide obtained by heating dilinoleic acid with 1,3-dimethyl urea in amounts such that there is present substantially 2.1 nitrogen atoms per carboxyl group, with (2) diglycidyl ether of triethylene glycol in an amount such that there is present substantially 1 epoxide group per nitrogen atom, said heating of (1) and (2) being carried out at a temperature of substantially 70° C.

No references cited.